United States Patent [19]

Yuichi et al.

[11] Patent Number: 5,110,463
[45] Date of Patent: May 5, 1992

[54] SLURRY FILTER APPARATUS WITH MEANS TO DIRECT SLURRY TO FILTER FACE AT AN ANGLE

[75] Inventors: Takahashi Yuichi, Tochigi; Azuma Katsuji, Tokyo, both of Japan

[73] Assignee: Fuji Filter Kogyo Kabushiki Kaisha, Tokyo, Japan

[21] Appl. No.: 460,068

[22] PCT Filed: Mar. 15, 1989

[86] PCT No.: PCT/JP89/00280

§ 371 Date: Feb. 1, 1990

§ 102(e) Date: Feb. 1, 1990

[87] PCT Pub. No.: WO89/11902

PCT Pub. Date: Dec. 14, 1989

[30] Foreign Application Priority Data

Jun. 3, 1988 [JP] Japan .................................... 135701

[51] Int. Cl.⁵ ........................ B01D 33/72; B01D 36/00
[52] U.S. Cl. ................................ 210/194; 92/165 R;
  210/257.1; 210/258; 210/359; 210/402;
  210/456; 210/486; 251/359; 251/368;
  277/DIG. 6; 417/569; 417/900; 417/DIG. 1
[58] Field of Search ................. 210/192, 195.3, 304,
  210/305, 416.1, 456, 512.1, 360.2, 788, 486, 805,
  256, 258, 167, 194, 195.1, 359, 257.1, 402,
  497.01; 209/211, 285, 281, 254; 417/570, 900,
  DIG. 1; 360/134; 251/368, 359; 277/DIG. 6

[56] References Cited

U.S. PATENT DOCUMENTS

| | | | |
|---|---|---|---|
| 3,259,244 | 7/1966 | Kaljo et al. | 209/281 |
| 4,017,390 | 4/1977 | Vicard | 210/304 |
| 4,097,382 | 6/1978 | Cruea | 210/456 |
| 4,113,626 | 9/1978 | Detcher | 209/281 |
| 4,236,999 | 12/1980 | Burgess et al. | 209/270 |
| 4,334,986 | 6/1982 | Frykhult | 210/304 |
| 4,512,880 | 4/1985 | Connolly | 210/456 |
| 4,587,016 | 5/1986 | Sumiyoshi | 210/486 |
| 4,597,871 | 7/1986 | Okouchi et al. | 210/456 |
| 4,756,831 | 7/1988 | Menzel et al. | 210/257.1 |
| 4,844,789 | 7/1989 | Lundqvist | 209/271 |
| 4,863,617 | 9/1989 | Katoh et al. | 210/806 |

FOREIGN PATENT DOCUMENTS

| | | | |
|---|---|---|---|
| 923589 | 2/1955 | Fed. Rep. of Germany | 417/570 |
| 2615531 | 10/1977 | Fed. Rep. of Germany | 417/570 |
| 3611952 | 10/1986 | Fed. Rep. of Germany | 417/900 |
| 54-24985 | 8/1979 | Japan | 210/304 |
| 59-103976 | 6/1984 | Japan | 417/900 |
| 62-19175 | 1/1987 | Japan | 210/195.3 |
| 1177530 | 9/1985 | U.S.S.R. | 417/900 |

*Primary Examiner*—Frank Spear
*Assistant Examiner*—Joseph Drodge
*Attorney, Agent, or Firm*—Lowe, Price, LeBlanc & Becker

[57] ABSTRACT

A slurry filter apparatus in which a pump mechanism having a valve and a valve seat, each of which is made of a wear-resisting metal material, is capable of moving a slurry of high density and containing hard particles, under pressure, the flow of slurry being injected so as to strike the face of the filter at an a predetermined, non-tangential angle. Coarse particles contained in the slurry are uniformly dispersed by the shearing forces due to cavitation generated through the high pressure injection of the slurry and abrupt speed changes of the flow of slurry. A caked layer of particular material is thereby prevented from forming on the surface of the filter.

12 Claims, 8 Drawing Sheets

SLURRY FILTER APPARATUS WITH MEANS TO DIRECT SLURRY TO FILTER FACE AT AN ANGLE

TECHNICAL FIELD

This invention relates to a strainer or a filter apparatus adapted to various kinds of slurry such as emulsions containing fine particles of pigment and paint, raw materials for fine ceramics, magnetic materials, finely ground food materials and food additives, ship fuels, and mud.

BACKGROUND ART

The base film of a magnetic tape used commonly in video tape recorders contains particles of diameters less than 3 or 4 microns which are provided in order to make the magnetic tape slippery. It is preferable to make the tape as thin as possible, therefore if the diameter of the lubricating particles contained in the coating on the magnetic tape is larger than a predetermined diameter, the tape is considered to be defective. In accordance with the filter apparatus of the present invention, it is possible to provide lubricating particles of uniform diameter which can be used to manufacture defect free magnetic tape.

Conventionally, in the thread manufacturing field, thread or yarn is dyed by blending pigment particles directly into the thread. If the pigment particles to be mixed into the thread are larger than a predetermined diameter, gnarls are formed in the thread and as a result faults occur in the weaving operation of the defective thread by a weaver machine. It is therefore important that the particle diameter of the pigment blended with the thread is uniform. Using the filter apparatus according to the present invention the diameters of pigment particles can be kept consistent so that colored thread free of defects ca be produced.

In the field of fine ceramics, if any coarse particles are contained in the raw material or if foreign particles are absorbed from the environment into the raw material during the manufacture of fine ceramics, they result in defects in the finished products after the baking operation. It is essential therefore to remove all coarse or irregular particles and foreign particles from the raw material of fine caramics. In accordance with the filter apparatus of the present invention, any undesired particles such as coarse or foreign particles can be eliminated from the raw material and, thanks to the purity of the raw material, fine ceramics free of defects can be producted.

Thus, the filter apparatus of the present invention is useful for filtering undesired particles from various types of slurry so as to obtain slurry containing only particles which are less than a predetermined diameter.

Another favorable aspect of the filter apparatus, according to the invention is its capacity to disperse or distribute particles in a slurry. The dispersive function makes the invention particularly useful in the refining process for fuel oil, in addition to the various industrial fields mentioned above. For example, C-class heavy oil used commonly as ship fuel oil contains a large percentage of sludge residue. The sludge residue contains various substances such as catalysts and high molecular substances. Therefore before C-class heavy oil is used as a fuel for a diesel engine the useless elements of the sludge must be removed. The high molecular substances contained in the sludge can be used as a fuel if the particles of the substance are well distributed. The high molecular substances, however, tend to clog filter elements making it difficult to strain sludge to obtain the high molecular substances by means of conventional filter systems. In accordance with the filter apparatus of the present invention, dispersion and filtering operations are simultaneously carried out making the filtering operation extremely efficient.

A filter apparatus manufactured by the applicants of the present invention under the name fujimicro sonic filter carries out a continuous filtering operation during which material caked onto the surface of the filter element is continuously removed. In this filter apparatus, there are an exterior chamber and an interior chamber which are separated from each other by cylindrical filter. The exterior chamber has an inlet and the interior chamber has an outlet. Layers of material caked onto the filter element of the filter apparatus are continuously broken up with ultrasonic waves during the filtering operation.

FIGS. 2 and 3 give a side elevation cross sectional view and a cross sectional plan view of the above prior art filter apparatus, in which caked layers of material are continuously broken up by means of ultrasonic waves. As shown in FIG. 3, slurry is introduced through an inlet 30 and discharged from an outlet 32 after it is filtered through a filter 31. During the filtering operation, the coarse particles contained in the slurry form a layer on the surface of the filter element. Ultrasonic waves are directed onto the layer of material on the filter from a horn 34 connected to an ultrasonic wave generator 33, whereby coarse particles are dispersed, thus removing the caked layer. Because the cylindrical filter continuously rotates, the whole surface of the filter is cleaned by ultrasonic waves in successive portions. In order for the filter apparatus to operate properly, it is necessary that the particles are dispersed by the ultrasonic waves at a rate that is equal to, or better which exceeds, the rate at which the particles accumulate on the filter surface.

The dispersing and filtering capacity of the apparatus is determined by various factors relating to the amplitude of ultrasonic waves, the shape of the horn, the distance between the front end of the horn and the filter element, the pressure of liquid to be treated, and the rotation speed of the filter. The cohering particle volume is determined by the particle density of the liquid, particle diameter, and mesh size of the filter. Although the above type of filter apparatus using ultrasonic waves has considerable filter capacity, the conventional filter apparatus is still sometimes insufficient to filter slurry having high particle density.

The general purpose of the present invention is to provide a high efficiency filter apparatus capable of carrying out a continuous filtering operation for slurries containing hard fine particles and/or having high particle density.

DISCLOSURE OF THE INVENTION

The filter apparatus of the present invention has a filter portion provided with an exterior chamber having an inlet and an outlet for slurry, each connected to a slurry tank containing the slurry to be treated, and an interior chamber having an outlet for the treated filtrate. The chambers are separated by a filter. The slurry is injected under high pressure into the exterior chamber through the slurry inlet. The flow of slurry is directed so as to strike the filter element surface at an angle. Cavitation generated in the high speed slurry flow and the abrupt speed change of the slurry flow generate shearing force which effectively disperses coarse particles contained in slurry within the flow. Meanwhile the injected slurry flows along the surface of the filter element. Because the slurry is injected at an angle so as to cause a substantial portion thereof to flow along or parallel with the surface of the filter, the caked layer is prevented from forming on the surface. Thus the flow ejected from the inlet strikes the filter surface at an angle and dislodges coarse particles sticking to the filter element. As described above, in accordance with the present invention, liquid to be treated is filtered in a manner wherein the parallel flow continuously dislodges any particles stuck in the filter mesh. The portion of the slurry which does not pass through the filter is discharged through the outlet provided in the exterior chamber and thereafter is conveyed within a slurry flow circulating within the chamber and is eventually returned to the slurry tank.

Alternatively, the slurry flow ejected from the slurry inlet may be once deflected by a hard deflector board so as to strike the surface of the filter.

The filter apparatus of the present invention further comprises a pump mechanism for pumping slurry of high density or containing hard particles under pressure. Valves and valve seats of the pump mechanism are composed of wear-resisting metal. Of the plural packings placed on the wall of a cylinder of the pump the packings placed near the cylinder side are manufactured of wear-resisting resilient resin material.

BEST MODE FOR EXECUTING THE INVENTION

Figure 1:
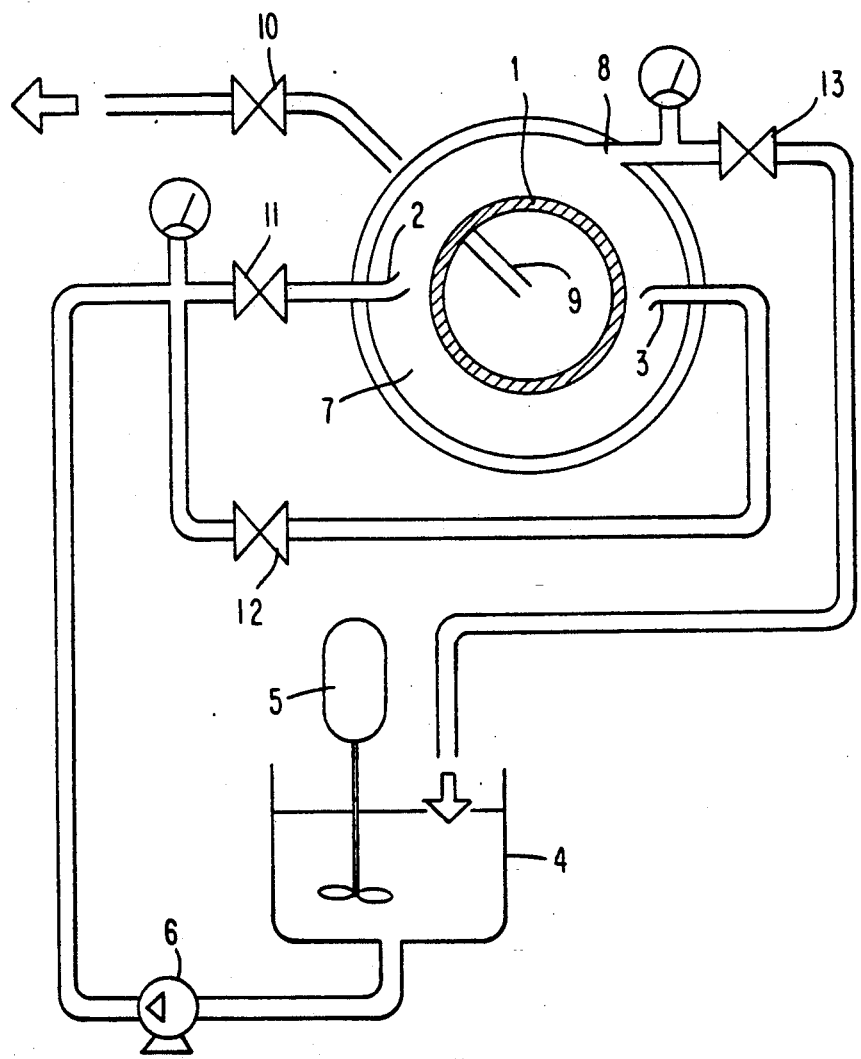
FIG. 1 is a systematic diagram for explaining an operation of a filter apparatus according to the present invention.
Figure 2:
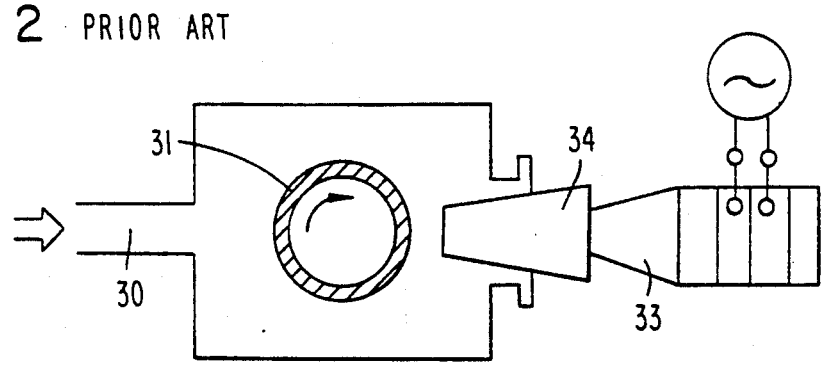
FIGS. 2 and 3 are schematic depictions of a prior art filter apparatus using ultrasonic waves.
Figure 3:
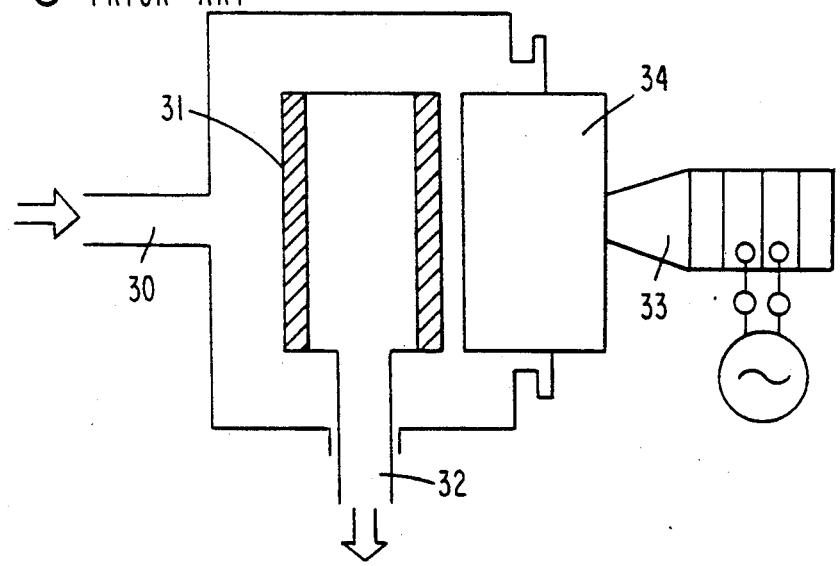

The operation of the filter apparatus according to the present invention will now be explained with reference to the accompanying drawings. FIG. 1 is a schematic view for explaining the operation of the filtering system or filter apparatus of the present invention. In the apparatus, a cylindrical filter is provided as the filter. The slurry contained in a slurry tank 4 is mixed by means of a mixer 5. The mixed slurry is forcibly sent to the filter apparatus by means of a pump 6. The slurry is forcibly sent to the filter apparatus at a pressure that is sufficient to disperse and clean the slurry injected into the filter apparatus. The optimum pressure varies according to the type of slurry and the pumping pressure is selected accordingly. Generally, it is necessary to forcibly send the slurry under at least 10 kgf/cm$^2$ of pressure.

The slurry is injected at a selected angle into a filter exterior chamber 7 (hereinafter will be referred to as a filtering chamber) defined within the filter apparatus, through nozzles 2 and 3, each of which is provided on the front end of an inlet communicating with the filter apparatus.

The slurry thus injected forms a vertical flow within the filtering chamber 7. A portion of the slurry flows along the filter face substantially parallel thereto and some of the slurry passes through the filter. The portion passing through the filter 1 passes into an interior chamber of the filter and is discharged through an outlet 9. The unfiltered portion of the slurry is discharged through a recirculation outlet 8 to be returned to the slurry tank 4.

Pressure differences generated in the above process, between the interior and the exterior of the filter 1 determine the filtering speed. This pressure difference is controlled by manual operation of control valves 10, 11, 12 and 13. It is of course possible to replace these valves 10, 11, 12 and 13 with automatic valves controlled by a microcomputer.

Because the surface of the filter 1 is always exposed to flowing slurry, it is difficult for a caked layer to form on with filter face as tends to occur the conventional filter apparatus. Consequently, it is possible to operate the slurry filter apparatus according to the present invention for a long period without any interruption. When the mesh of the filter 1 becomes clogged, the pressure difference between the interior and the exterior of the filter 1 be reduced to zero by closing the valve 10, so that any material clogging the filter mesh is carried away by means of a backflow of slurry flowing through the mesh.

Due to the high-speed flow of slurry injected from the nozzle and the sudden change in flowing speed of slurry occurring at the moment of injection, shearing forces are generated in the slurry which function to distribute the particles. Cavitation is also generated in the high-speed flow of slurry which also serves to accelerate the distribution of particles in the slurry, in addition to the shearing force mentioned above. Thus, turbulence in the high-speed flow of slurry ejected from the nozzles provided on the front end of the inlet serves to distribute the particles in the slurry.

According to the filter apparatus of the present invention, while the slurry circulates in the filter chamber, the recirculation outlet 8 is formed so as to direct the outward flow of slurry tangentially to the filtering chamber 7. This results in a ventricular flow which speeds up the circulation of the slurry and the entrained particles. As a result, the slurry is well dispersed.

Although two nozzles are depicted in the drawing, it will be readily appreciated by those skilled in the art that other numbers of nozzles are possible and that the number of nozzles will be selected in accordance with the size of the filter apparatus, the viscosity of slurry, and so on.

Figure 4:
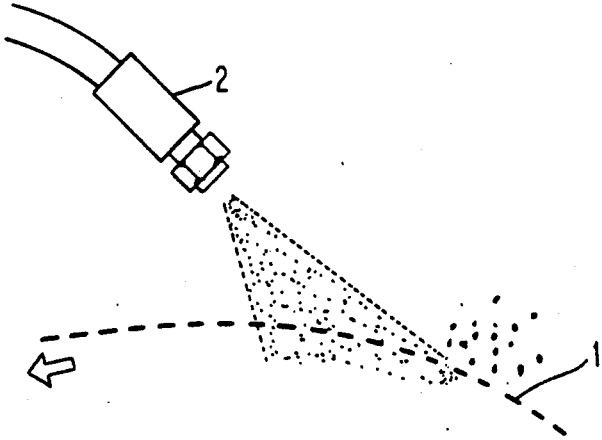
FIG. 4 is an schematic view of a nozzle dislodging particles from a clogged filter element due to the slurry flow in accordance with the filter apparatus of the present invention.

As shown in FIG. 4, when the slurry injected from the nozzle 2 provided on the front end of the inlet strikes the face of the filter 1, fine particles clogging in the filter element are driven out of the element. Because the filter 1 is rotated, successive clogged filter portions of its periphery are exposed to the high speed flow of slurry from the nozzle so that the entire periphery of the filter is effectively cleaned with each revolution. The cleaning effect is improved when the slurry flow strikes the filter face at a sharp angle. However, this tends to damage the filter element. In practice, it has been found that the slurry is preferably injected at an angle that is not more than 30 degrees with respect to a tangent where the slurry strikes the filter at the filter surface. Experiment has shown that an approximately 15 degree angle with respect to the tangent to be optimum. The appropriate injection angle is set by adjusting the nozzles. It is preferable that the filter is rotated as the high-speed slurry flow is sprayed onto the filter, since in this way the whole surface of the filter is cleaned, and the life time of the filter element is extended.

Figure 5:
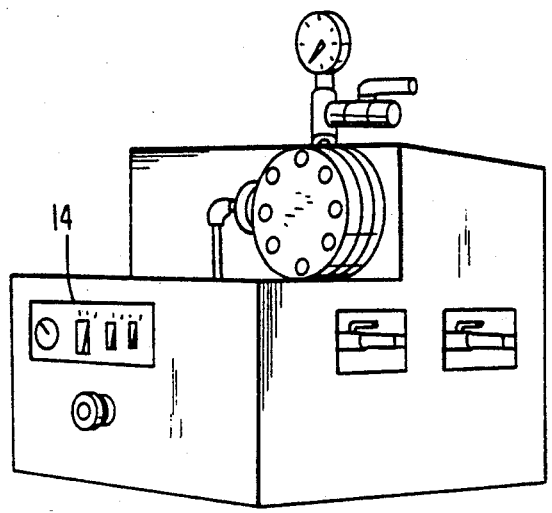
FIG. 5 is a perspective view of an embodiment of the filter apparatus according to the present invention.
Figure 6:
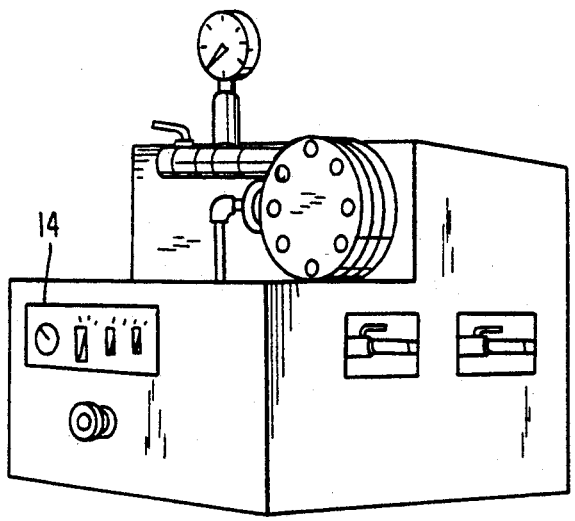
FIG. 6 is a perspective view of another embodiment of the filter apparatus according to the present invention.

FIG. 5 is a perspective view showing the filter apparatus according to the present invention. The filter apparatus shown has a recirculation outlet defined at the upper portion of an filter chamber. The slurry is injected from the left side of the filter chamber. The rotation rates of the pump and the filter are controlled through a control panel 14 situated at the front face of the filter apparatus.

Figure 7:
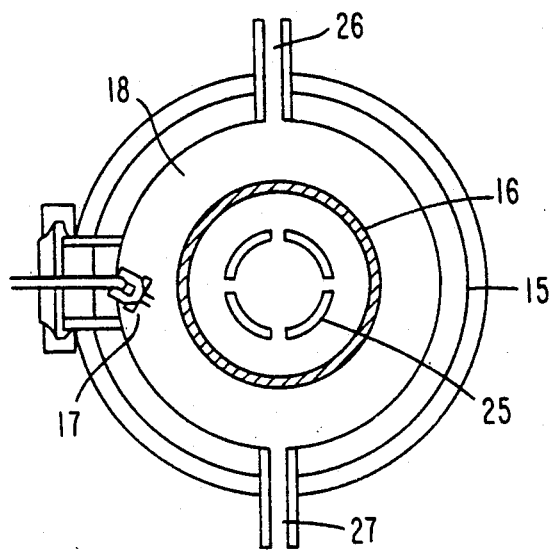
FIGS. 7 to 9 are cross sectional views of the filter mechanism of three embodiments of the present invention.

FIG. 7 is a transverse sectional view of a filtering mechanism provided with a housing 15. A cylindrical filter 16 made of stainless steel (SUS 304) is rotatably received in the housing 15. The nozzle 17 is arranged so as to inject the slurry at an angle about 15 degrees inward from the tangential direction of the filter surface. The filter chamber 18 has a recirculation outlet 26 at its upper side and a drain port 27 at its lower portion. During the filter operation, the drain port 27 is closed. Slurry is filtered through the filter 16 and discharged out of the filter through the outlet 25. Remaining unfiltered slurry returns to the slurry tank through the recirculation outlet 26.

Figure 8:
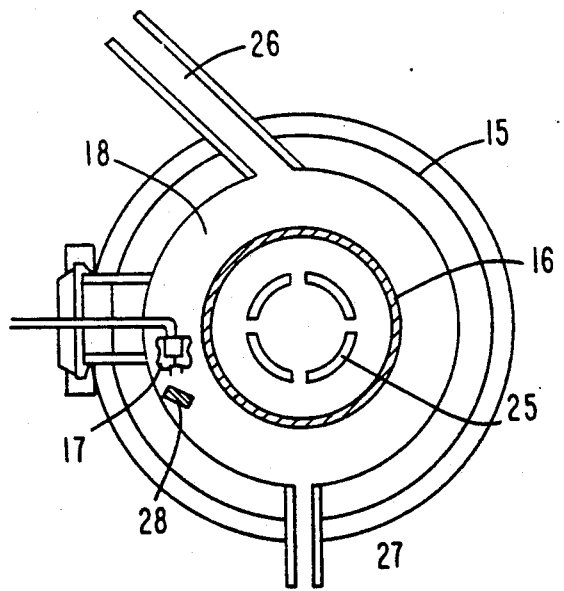

According to another embodiment of the filter apparatus shown in FIG. 8, the flow of slurry ejected from the nozzle 17 is not aimed directly toward to the filter face. Instead, in the filter apparatus shown in FIG. 8, the nozzle 17 is directed outward from the tangential direction of the filter 16. A deflector 28 is placed on a direction of injection of the nozzle 17 and redirects the flow of slurry against the filter. When the slurry strikes the deflector 28, particles in the flowing slurry collide violently with the hard deflector 28 and they are thoroughly distributed. The deflector 28 is preferably made of a hard antiabrasive material such as tungsten carbide, alumina or the like. In this embodiment of the present filter apparatus, the recirculation outlet is arranged at a tangent to the direction of the vertical flow of the slurry so that the slurry is easily inducted into the recirculation port.

Figure 9:
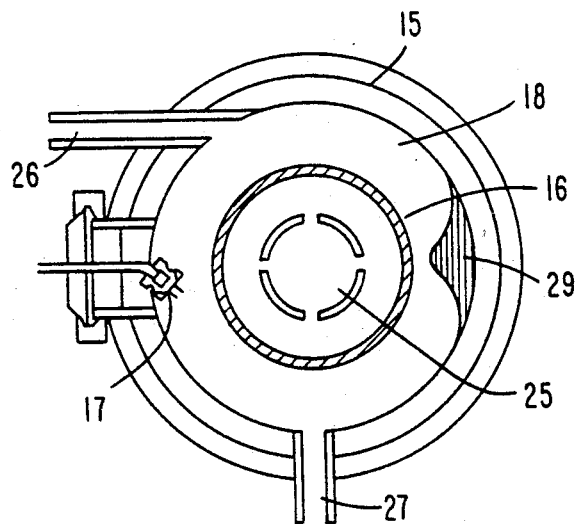

In still another embodiment of the filter apparatus of the present invention, as shown in FIG. 9, the vertical flow of slurry generated in the filter chamber is utilized for solving the problem of filter clogging. As shown in FIG. 9, a flow restrictor member or a negative pressure generating member 29 is provided in the filter chamber in order to restrict the flow of slurry at the narrowed portion, so that negative pressure is generated in the filter chamber owing to the hydrodynamic effect. This negative pressure is effective in drawing clogging particles out of the mesh.

Figure 10:
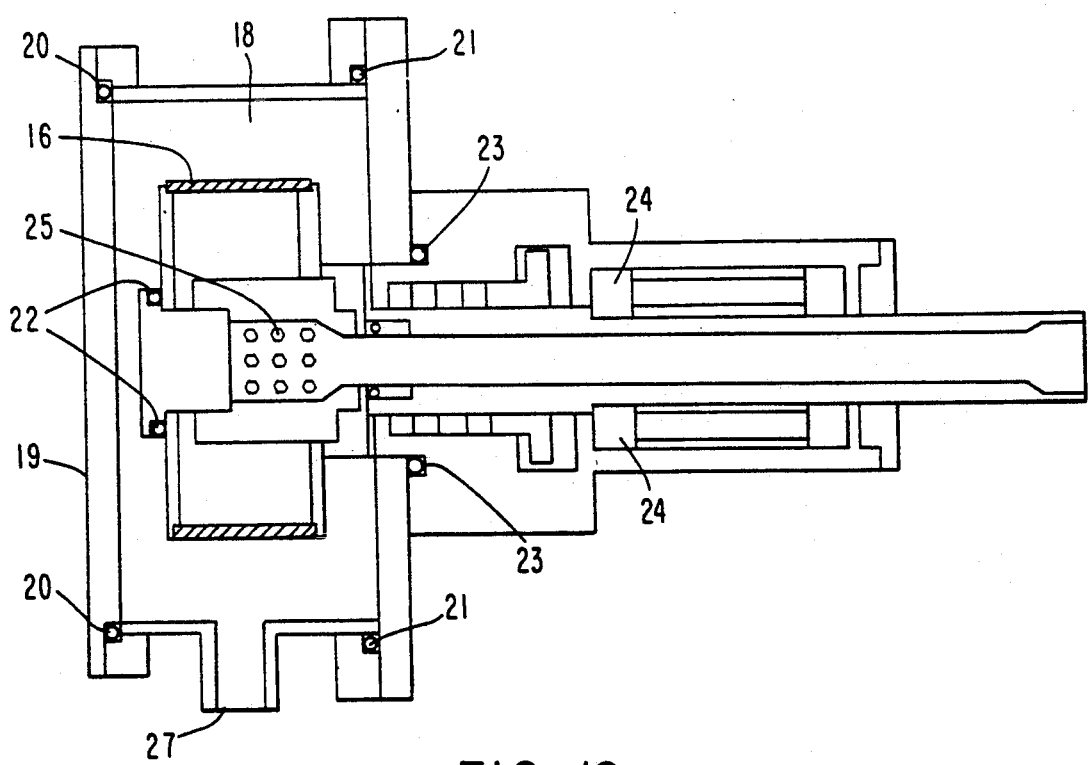
FIG. 10 is a longitudinal cross-sectional view of the filter mechanism of the present invention.

As will be appreciated from the longitudinal cross sectional view of the apparatus given in FIG. 10, the filter chamber 18 is enclosed within a housing having a lid 19. A number of O-rings 20, 21, 22 and 23 are provided for sealing the chamber 18. The support structure of the filter element is rotatably mounted to the housing by means of bearings 24. The liquid passed through the filter 16 flows out of the inner chamber from the outlet 25.

Figure 11:
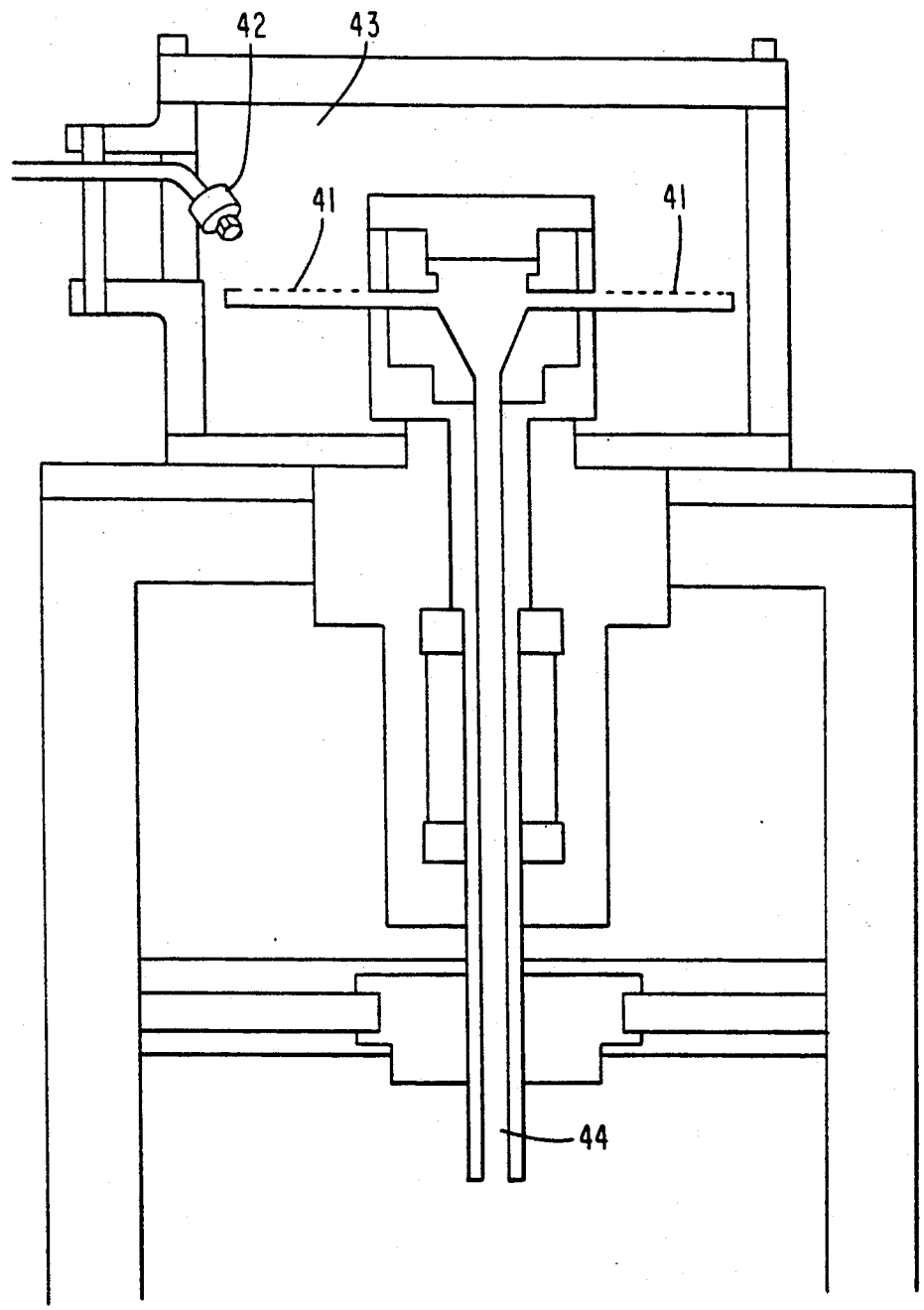
FIG. 11 is a side elevational view of the filter apparatus according to a still further embodiment of the present invention.

It will be appreciated that embodiments of the filter apparatus of the present invention may comprise filters of various shapes other than the cylindrical filter configuration employed in the embodiment described above. In FIG. 11, an embodiment of the filter apparatus is shown in which a disc shaped filter is used. The disc-shaped filter 41 is arranged so as to define a horizontal plane and is cleaned by the flow of slurry ejected from a slantly disposed nozzle 42 of the slurry outlet into the interior of the filter chamber 43. As in the embodiment having the cylindrical filter, a portion of the slurry flows parallel to the face of the disc-shaped filter during the filtering operation of slurry through the filter element. Filtered liquid is drained through the outlet 44 after passing through the disc-shaped filter. The slurry outlet is oriented in the direction of the flow of slurry filtrate so as to induct slurry smoothly.

Figure 12:
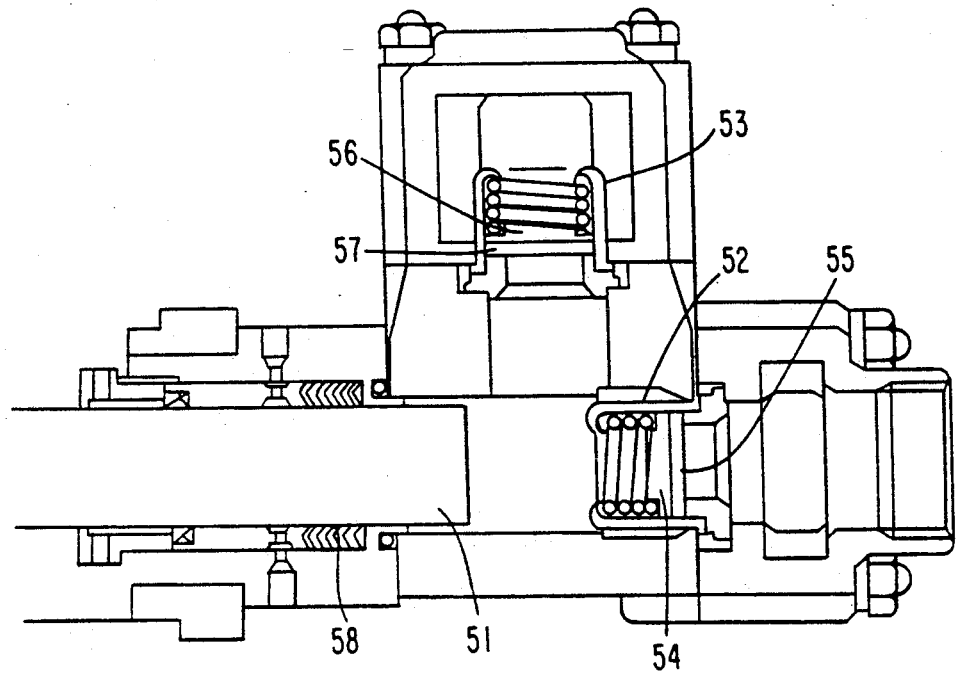
FIG. 12 is a cross-sectional view of a plunger pump used in the filter apparatus according to the present invention.

FIG. 12 is a sectional view of a plunger pump adapted for use in the filter apparatus of the present invention. In operation, a plunger 51 made of a ceramic material moves to the right and left in the figure. By the action of the plunger, slurry is drawn in through an intake valve 52 and discharged through a discharge valve 53. Because the slurry contains fine hard particles, valve discs 54 and 56, and valve seats 55 and 57 respectively ar preferably made of ultra-hard alloy metal in order to prevent them from wearing out.

According to still another embodiment of the filter apparatus, the valve discs and valve seats are made of stainless steel and coverings of ultra-hard metal alloy are brazed onto the portions most subject to wear.

Figure 14:
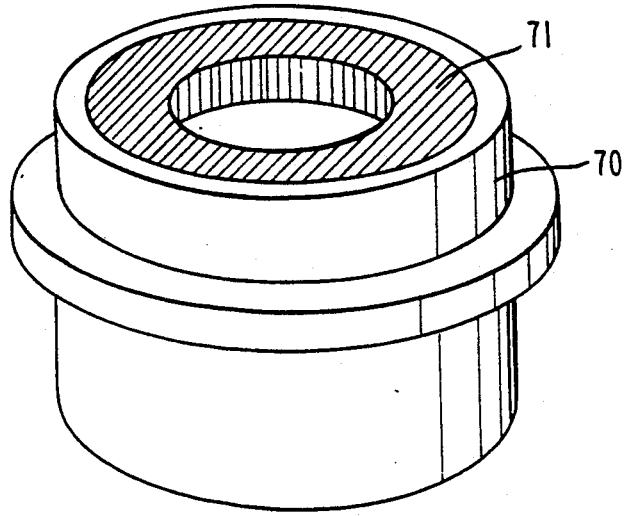
FIG. 14 is a perspective view of a valve seat in which a member of hard fragile material is shrink fitted.
Figure 15:
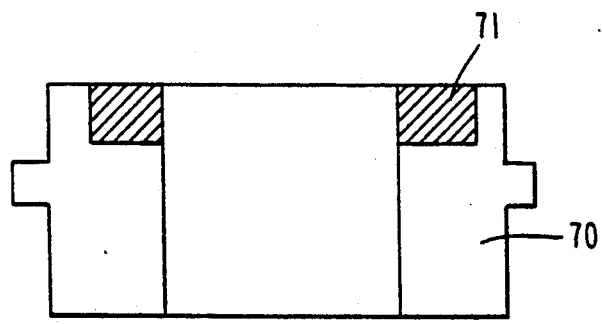
FIG. 15 is a sectional view of the valve seat shown in FIG. 14.

FIGS. 14 and 15 show another example of a valve seat. The valve seat 70 is made of stainless steel. And, a member 71 made of relatively fragile but very hard material such as alumina or ceramic is attached to the interior periphery by shrink fitting. The valves are preferably made of a composite of stainless steel and the hard relatively fragile material such as alumina or ceramic. The parts made of such fragile material are attached to the metal by a known shrink process.

Figure 13:
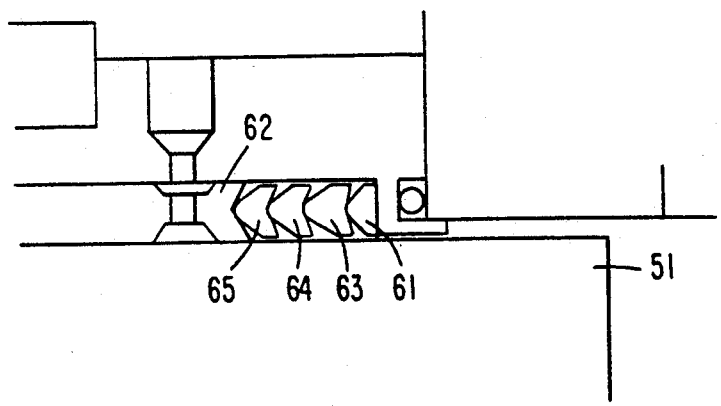
FIG. 13 is an enlarged sectional view of the portion of the filter apparatus shown in FIG. 12 in which V-packings are provided.

FIG. 13 is an enlarged view of the cylinder portion of the pump shown in FIG. 12. Three V-shaped cross section packings 63, 64 and 65 are installed between a male adapter 61 and a female adapter 62. These packings are ordinarily made of a well known packing material NBR (Nitrile-Butadine Rubber). In one embodiment, as for the V-shaped cross section packings 63, 64 and 65, for example, the packing 63 is made of urethane resin and the other packings 64 and 65 are made of NBR. The V-shaped urethane packing deforms easily under the pressure applied thereon by the slurry and prevents the slurry from passing around the sides of the plunger. It will be noted that urethane resin has considerable wear resistant property, so that the urethane packing can enjoy a long life.

It is preferable to place a few V-shaped cross section packings made of wear-resistant and resilient material near the cylinder chamber of the filter apparatus and that the remaining packings made of ordinary material. As a result, an effective seal is obtained through collective action of the packings.

Although a number of arrangements of the invention have been mentioned by way of example, it is not intended that the invention be limited thereto. Accordingly, the invention should be considered to include any and all configurations, modifications, variations, combinations, or equivalent arrangements falling within the scope of the next claims.

We claim:

1. A slurry filter apparatus, comprising:
   a first chamber having a slurry inlet and a recirculation outlet respectively arranged so as to direct a flow of slurry into and out of said first chamber;
   a second chamber having a filtrate outlet;
   a rotatably mounted filter separating said first and second chambers,
   means for flowing slurry to said slurry inlet from a slurry tank;
   means for ejecting the flow of slurry under pressure from said slurry inlet so as to strike a face of said filter at a predetermined angle so as to be non-tangential to the face of said filter; and
   means for returning unfiltered slurry from said first chamber through said recirculation outlet to said slurry tank.

2. A slurry filter apparatus according to claim 1, wherein:
   an axis of direction of slurry inlet flow is aligned to be not more than 30° measured outwardly from a tangent at the face of the filter where the flow of slurry from said slurry inlet strikes the face of the filter.

3. A slurry filter apparatus according to one of claim 1, further comprising:
   means for directing the flow of slurry ejected from said slurry inlet against a deflector disposed to deflect said flow of slurry toward the face of the filter.

4. A slurry filter apparatus according to claim 1, further comprising:
   restricting mans for restricting an area of said first chamber available to the flow of slurry.

5. A slurry filter apparatus comprising:
   a first chamber for receiving slurry;
   a second chamber for collecting filtrate from said slurry;
   a curved filter having a convex surface separating said first and second chambers; means comprising
   a recirculation outlet located in said first chamber for retrieving unfiltered slurry form said first chamber;
   means for conveying filtrate from said second chamber; and means comprising
   a plurality of inputs located in said first chamber for directing slurry under pressure to strike predetermined points on said convex surface of said filter at predetermined non-tangential angles, said plurality of inputs directing said slurry to said filter from different directions.

6. A slurry filter apparatus, comprising:
   a first chamber having a slurry inlet and a recirculation outlet respectively arranged so as to direct a flow of slurry into and out of said first chamber;
   a second chamber having a filtrate outlet; a filter separating said first and second chambers,
   means for flowing said slurry to said slurry inlet from a slurry tank;
   means for ejecting the flow of slurry under pressure from said slurry inlet so as to strike a face of said filter at a predetermined angle so as to be non-tangential to the face of said filter; and
   means for returning unfiltered slurry from said first chamber through said recirculation outlet to said slurry tank,
   wherein said filter comprises a rotatable cylinder.

7. A slurry filter apparatus, comprising:
   a first chamber having a slurry inlet and a recirculation outlet respectively arranged so as to direct a flow of slurry into and out of said first chamber;
   a second chamber having a filtrate outlet; a filer separating said first and second chambers,
   means for flowing said slurry to said slurry inlet from a slurry tank;
   means for ejecting the flow of slurry under pressure from said slurry inlet so as to strike a face of said filter at a predetermined angle so as to be non-tangential to the face of said filter; and
   means for returning unfiltered slurry from said first chamber through said recirculation outlet to said slurry tank,
   wherein said filter comprises a rotatable disc.

8. A slurry filter apparatus, comprising:
   a first chamber having a slurry inlet and a recirculation outlet respectively so as to direct a flow of slurry into and out of said first chamber;
   a second chamber having a filtrate outlet; a filter separating said first and second chambers,
   means for flowing said slurry to said slurry inlet from a slurry tank;
   means for ejecting the flow of a slurry under pressure from said slurry inlet so as to strike a face of said filter at a predetermined angle so as to be non-tangential to the face of said filter;
   means for returning unfiltered slurry from said first chamber through said recirculation outlet to said slurry tank; and
   a plunger pump arranged for pumping slurry to said slurry inlet under pressure, said plunger pump having a cylinder with a side relatively nearer said first chamber a valve and a valve seat, said valve and said valve seat being made of wear-resisting material, a group of packings made of wear-resisting resilient resisting material and placed at the cylinder chamber side, and another group of packings, said groups of packings being installed on a wall of said cylinder.

9. A slurry filter apparatus according to claim 8, wherein said wear-resisting resilient material includes urethane resin.

10. A slurry filter apparatus according to claim 9, wherein said another group of packings is formed of nitrile-butadiene rubber, and said first group of packings are placed closer to said slurry inlet than said another group of packings.

11. A slurry filter apparatus according to claim 8, wherein said valve and said valve seat are each formed as composites by shrink fitting of wear-resisting means.

12. A slurry filter apparatus according to claim 8, wherein said valve and valve set wear resisting material comprises a first wear-resisting material shrink fitted around a second wear-resisting material, said first wear-shrinking material being composed of stainless steel and said second wear-resisting material being composed of a material selected from the group consisting of alumina and ceramic.

* * * * *